United States Patent
Gothoskar et al.

(10) Patent No.: US 9,444,273 B1
(45) Date of Patent: Sep. 13, 2016

(54) PEER-TO-PEER WIRELESS COMMUNICATION NETWORK AMONG RECHARGEABLE BATTERIES

(71) Applicant: SYMBOL TECHNOLOGIES, INC., Lincolnshire, IL (US)

(72) Inventors: Gaurav Gothoskar, St. James, NY (US); Rohan Chopra, Port Jefferson Station, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/633,188

(22) Filed: Feb. 27, 2015

(51) Int. Cl.
*H04M 1/00* (2006.01)
*H02J 7/00* (2006.01)
*H04W 68/00* (2009.01)
*H04W 84/20* (2009.01)

(52) U.S. Cl.
CPC .......... *H02J 7/0021* (2013.01); *H04W 68/005* (2013.01); *H04W 84/20* (2013.01)

(58) Field of Classification Search
USPC ................. 455/343.1–343.6, 41.1–41.3, 572
See application file for complete search history.

(56) References Cited

U.S. PATENT DOCUMENTS

| | | | | |
|---|---|---|---|---|
| 8,093,864 | B2* | 1/2012 | Wright ................. | G08C 17/02 320/114 |
| 9,146,595 | B2* | 9/2015 | Forutanpour ...... | G01R 31/3606 |
| 2005/0009577 | A1* | 1/2005 | Kangas .............. | H04M 1/7253 455/572 |
| 2005/0162172 | A1* | 7/2005 | Bertness ............ | G01R 31/3627 324/426 |
| 2008/0151801 | A1* | 6/2008 | Mizuta ............... | H04W 52/343 370/311 |
| 2013/0148283 | A1* | 6/2013 | Forutanpour ...... | G01R 31/3606 361/679.31 |

* cited by examiner

*Primary Examiner* — Fayyaz Alam

(57) ABSTRACT

An apparatus and method for operating a peer-to-peer wireless communication network among batteries. A first step includes providing a plurality of batteries with each internally housing a processor and a wireless communication transceiver. A next step includes designating one of the batteries as a master in the network, and the remaining batteries as slaves. A next step includes measuring at least one battery operating parameter for each battery by its associated processor. A next step includes peer-to-peer communicating a health indication of each battery, based on the at least one battery operating parameter, to the master that can determine which of the batteries is the healthiest, and inform a user of the healthiest batteries.

15 Claims, 3 Drawing Sheets

PEER-TO-PEER WIRELESS COMMUNICATION NETWORK AMONG RECHARGEABLE BATTERIES

BACKGROUND

Many large government and business establishments (e.g. public safety, industrial, retail, etc.) utilize wireless communication devices operating in a trunked or wireless local area network (WLAN) in order to improve operational efficiency. For example, some communication devices are operable in a Wi-Fi™ (IEEE 802.11) communication network. Typically, these communication devices have rechargeable batteries. In those establishments that operate around the clock, where communication devices may be in relative constant use, there is insufficient time to wait to recharge the batteries of these communication devices. Therefore, these establishments may supply changing stations along with spare batteries that can be charged while the communication device is being used. When a device needs a freshly charged battery, a user can simply go to a charging station and exchange their exhausted battery with a freshly charged one. In some cases, where there are more batteries than charging stations, charged batteries can be put aside to be picked up for use while exhausted batteries are placed in the charger.

However, a problem arises as batteries get older and they have been recharged numerous times. In particular, older batteries can take different amounts of time to recharge, batteries may not all charge to the same voltage or level, or batteries may not hold their charge for the same amount of time. Typically, a standalone battery pack does not provide information regarding its state of charge, health, etc. Therefore, a user going to obtain a freshly charged battery will not know which one of the batteries in a group is the healthiest choice to replace an exhausted battery. Even in those cases where the battery includes a built-in display to show a user its health information, the user still needs to spend time going over each battery display to check which one is the healthiest. This is particularly undesirable in situations such as during a fire or police emergency.

Accordingly, there is a need for a technique to alleviate the above issues in rechargeable batteries.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
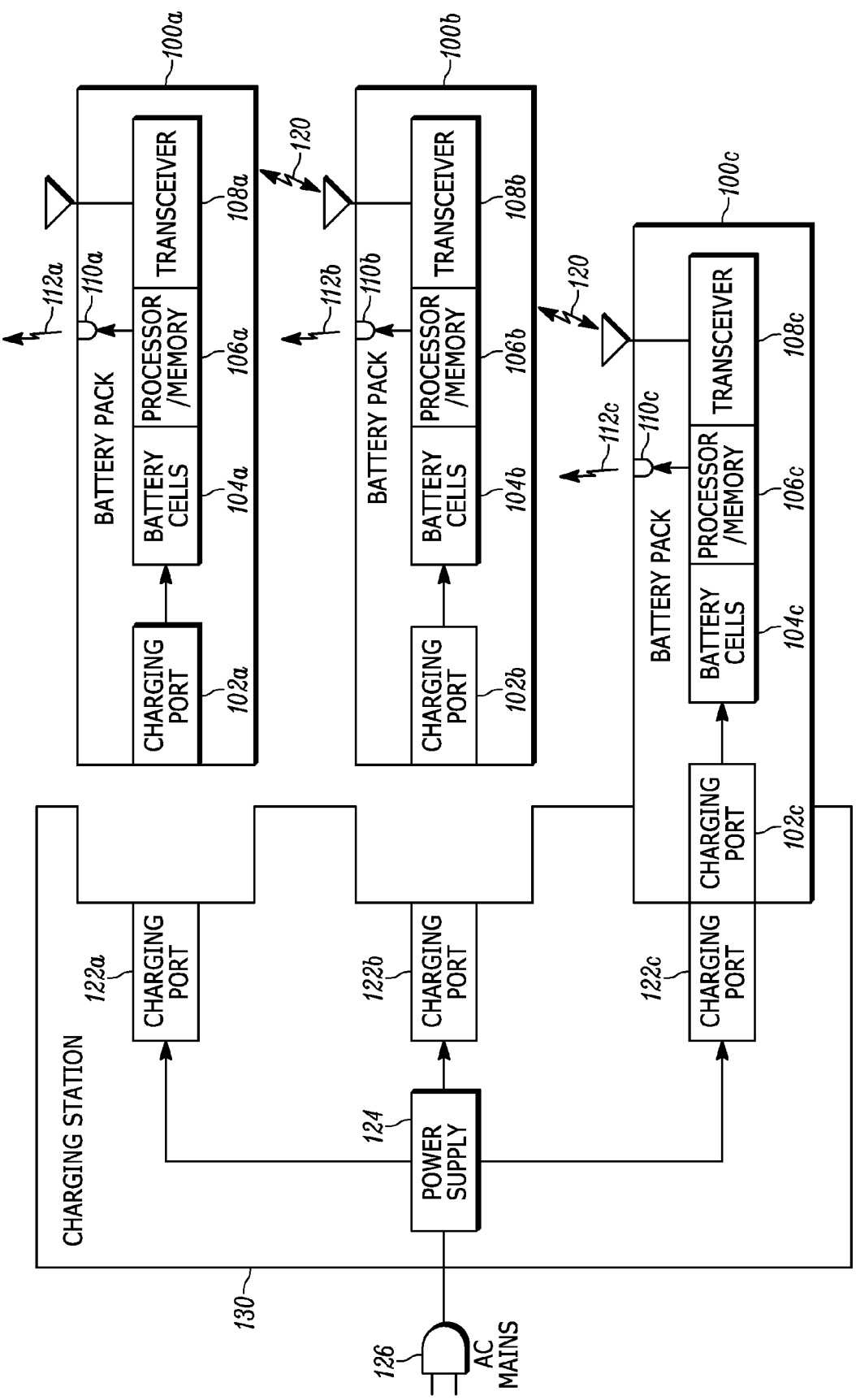
FIG. 1 is a simplified block diagram of a charger and batteries, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention incorporates a wireless communication protocol within each rechargeable battery pack itself. This wireless communication protocol can be anything ranging from Radio Frequency Identification, Bluetooth™, Wi-Fi™, etc An internal processor can be included in each battery pack along a wireless communication transceiver coupled thereto. Using an existing peer-to-peer protocol in the communication network, such as the ad-hoc IEEE 802.11 protocol for example, the batteries are able to communicate amongst themselves without requiring a centralize controller or server. Using the peer-to-peer protocol, one of the batteries can be designated as a master or group owner in the network, and the remaining batteries can be designated as slaves or clients. Alternatively, a battery pack can be initiated as a master by a gesture or user interrupt using sensors or buttons on the battery pack.

The processor of each battery is also operable to measure at least one battery operating parameter for each battery. These parameters establish a health of the battery and can include state or level of charge, open circuit voltage, etc. The batteries can communicate their identities and a health indication based on the associated measured parameters to the master in the peer-to-peer network using their transceivers. The master can then compare the health indications of the identified batteries and then use the peer-to-peer network to send a signal identifying those identified batteries having the healthiest measurements (e.g. highest level of charge), wherein each of those healthiest batteries identified in the received signal can alert a user on an associated user interface that it is one of the healthiest batteries among the plurality of batteries.

Referring to FIG. 1, the present invention provides a plurality of rechargeable battery packs 100. Each battery pack internally houses rechargeable battery cells 104, a processor 106 that can include a separate or conjoined memory, and a wireless communication transceiver 108 coupled to the processor. The battery pack also includes a charging port 102 that can engage a corresponding charging port 122 on a charging station 130 or cradle. The charging station 130 can be plugged into AC mains 126 that couples to a power supply 124 used to feed each charging port 122 of the charging station. When a battery pack (e.g. 100c) is inserted into the charging station, the charging port 102c of the battery pack engages the charging port 122c of the cradle, and the power supply 124 can then supply charge to the battery cells 104c of the battery pack 100c.

The battery pack also includes a user interface 110 that is driven by then processor 106. The user interface can be a simple light indicator (as shown) or a graphical user interface display built-in to the battery pack. The user interface 110 can indicate 112 an overall health of the battery, as will be detailed below. The processor, user interface, and transceiver are configured to provide the various embodiments of the present invention as described herein.

In accordance with IEEE 802.11 protocols for example, a peer-to-peer or ad hoc network can be self-formed where any device (e.g. battery pack 100) in the network can act as either a client or a server. In particular, one of the battery packs can be designated as a master (or group owner) in the network, and the remaining battery packs as slaves (or clients), using existing IEEE 802.11 peer-to-peer protocols. For example, battery pack 100*b* could act as the master and the remaining battery packs 100*a*, 100*c* could act as slaves. It does not matter whether a battery pack is inserted into the charging station or not in establishing the network or master/slave status. Alternatively, only those battery packs that are not connected to the charger could communicate their health to the master and inform a user of their health status.

In accordance with the present invention, the processor of each battery pack will measure at least one battery operating parameter used in indicating a health of the battery cells. Operating parameters can include state or level of charge, open circuit voltage, temperature, aging information, etc. These parameters can be weighted to provide an overall health indication of the battery cells. For example, level of charge could be more important than aging information, and therefore weighted more. The processor can use the measured and weighted parameters to determine an overall health indication of the battery cells which it can store in memory, along with an individual identity of the battery pack, such as a Media Access Control address.

The master will initiate polling of nearby slave battery packs (which will be limited to a certain distance based on signal strength that limits communications to those slave batteries in close proximity). After the master initiates the polling, each battery will broadcast, using its associated wireless communication transceiver, its identity and the health indication, such as a weighted number based on at least one battery operating parameter including, state or level of charge, open circuit voltage, etc. The health indication can be communicated directly to the master from each slave, can be part of the slave advertising/broadcast packet or can be relayed to the master among different intervening slaves in a mesh network configuration.

The master will collect this information from the network and store the information in its memory in a table listing the plurality of battery pack identities and their associated weighted health indications. The master can then sort this list (including itself) in order of best health indication. After the master decides which battery (or batteries in case of a tie) is healthiest (including itself), it can send a signal to the selected healthiest slave battery (or itself if it is the healthiest) to inform a user of this healthiest state on an associated user interface of the healthiest battery pack, e.g. that battery pack having the highest level of charge. For example, each battery pack can be provided with a light indicator coupled to the processor, wherein those batteries being identified by the master as being healthiest can trigger the light indicator to inform a user of its healthiest status. In this way, a user need not search through a group of battery packs trying to determine the best battery pack to choose, but can instead simply select the battery with the lighted indicator.

It should be recognized that the light indicator of the present invention can be implemented in an existing light or light emitting diode of the battery pack. For example, the battery pack may have an existing light indicator operable to indicate a charging status of the battery, e.g. lighted red means charging and lighted green means charged. The present invention can also use this same light indicator to indicate a health of the battery, such as by lighting the indicator using a color other than red or green, or by blinking or flashing the lighted indicator in any color. The present invention can also implement state of charge indication using a combination of LEDs such as a LED strip. In any of the above cases, the health indication shown by the lighted indicator can operate whether the battery pack in inserted into the charging station or not. In addition, the processor, transceiver, and light indicator turn off when coupled to the communication device. Alternatively, when coupled to the communication device, the processor can turn on periodically to measure at least one battery parameter, and turn on the light indicator in a manner to indicate to a user that the battery pack needs to be replaced or recharged if the measurement so deems.

Figure 2:
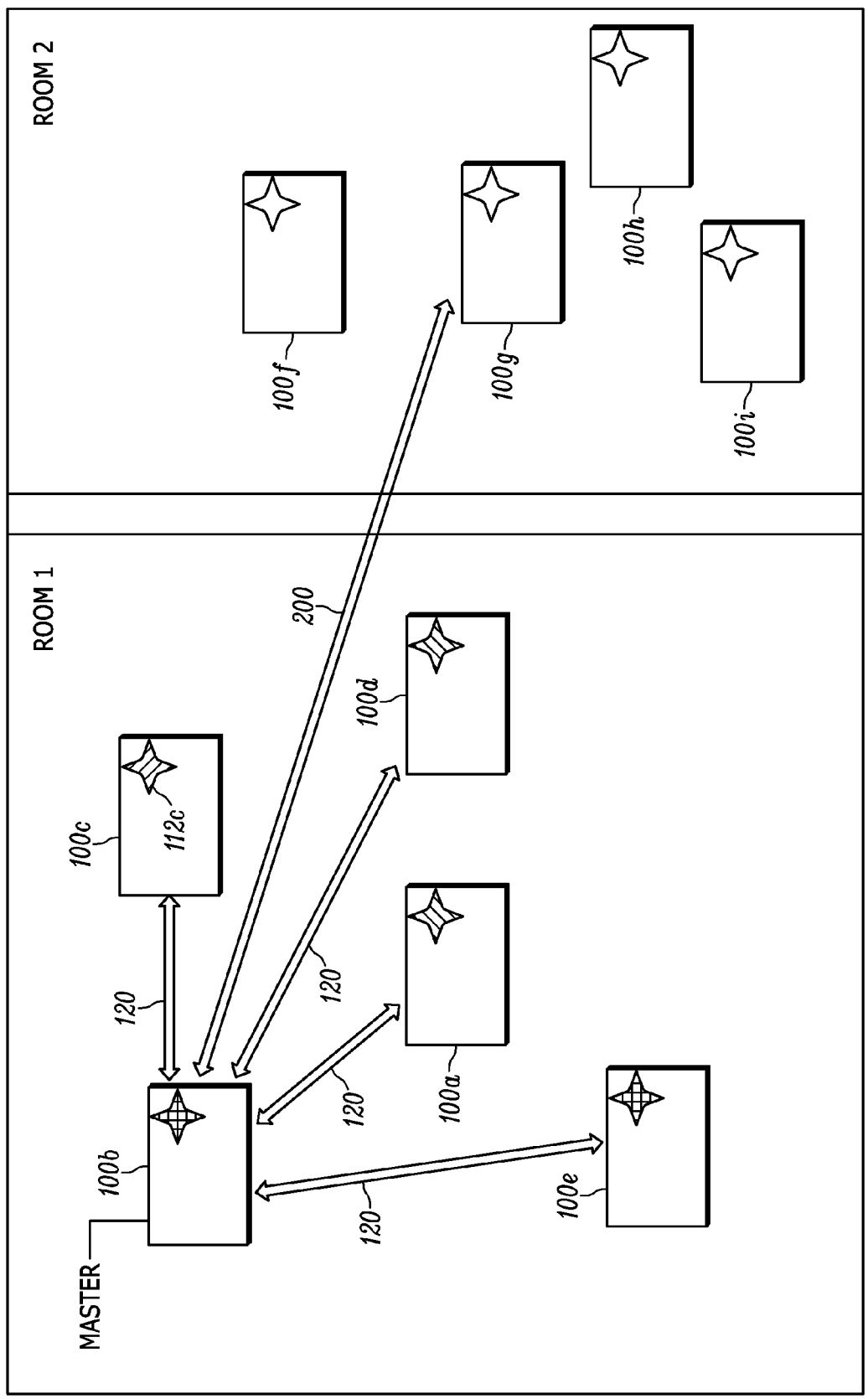
FIG. 2 is a simplified block diagram of a peer-to-peer communication network for rechargeable batteries, in accordance with some embodiments of the present invention.

Referring to FIG. 2, the rechargeable battery packs 100 are operable to wirelessly communicate 120 in a peer-to-peer communication network, wherein the batteries can be automatically added or removed from the network on an ad-hoc basis. It is envisioned that the wireless network could operate under any IEEE 802.11 communication protocol known in the art. However, it should be recognized that the present invention could operate under many different communication systems, including trunked, WLAN, Wireless Wide Area Networks, Bluetooth™, Radio Frequency Identification, and the like, as are known in the art. In particular, the network shown is a homogeneous network of similar battery packs 100 although it will be appreciated that a network incorporating various different devices, a heterogeneous network, can of course also be formed. The network could also include other wireless and wired communication devices of various types, which are not shown for the sake of simplicity.

A feature of the peer-to-peer network is that it can be dynamic. As a result, the present invention provides a technique for managing such a dynamic network as a result of battery packs being added to, or removed from, the network (e.g. being switched on or off, respectively, losing power or signal strength, moving out of range, etc.). For example, within each network a single master battery 100*b* is designated, to which the remaining batteries are slaved. The master can merely be determined as the station which initiates the network or that controls the network at any one time, and the master/slave relationship governs communication procedures. Typically, the master station is chosen by decision among all the stations 100 or by selection by a user. The master station would be responsible for managing the information-gathering and administration processes of the peer-to-peer network and continually update the slave units with information of the healthiest batteries. It is envisioned that the network of battery packs would use a similar protocol as DHCP (Dynamic Host Configuration Protocol) for efficiency.

It should be recognized that the peer-to-peer network can allow access to a fixed network infrastructure, such as a fixed access point which can be a central computer or server of the establishment (not shown). For example, any member of the network could access the fixed network through the master station. In this arrangement, the master station acts as a gateway for the slave stations. Alternatively, the slave stations could access the fixed network infrastructure directly. However, this could give rise to inefficiency and unnecessary duplication. Therefore, the present invention preferably does not utilize a fixed central controller.

The master designation can be carried out dynamically, based on a pre-selected network parameter such as signal strength. For example, the relative average received signal strength value for each battery pack from the other battery packs in the network can be used to designate the master, where the master is the battery pack transceiver having the highest signal strength value. Accordingly, the best placed battery pack at any time could become the master, and this is updated constantly to compensate for battery pack entering or leaving the network.

Referring back to FIG. 2, the master station is shown nominally as the upper left battery pack 100b, although as stressed above other factors may influence which devices are elected as the master, such as the strongest signaling device being physically located most centrally, in the network. Preferably, each time a slave communicates with the master, it can sends an updated network parameter value (e.g. signal strength) and, if this value exceeds the master's value then the slave can be newly designated the master, and the other slave are so informed. An alternative to the previous approach would be to enable the slaves and master stations to provide a broadcast packet that provides up to date signal strength of other stations that are measured during system operations. Thus the broadcast messages would provide information that can be evaluated by the master and slaves on the network. Information could be chosen to include such information as signal strength, traffic, processor demands and other factors such as interference.

It may be the case that the master loses power. As a result, the master can no longer manage the network. In this case, a new master may be chosen by the remaining battery packs. There should be sufficient time before switching functions for the master to inform the network that the present master will be leaving the network. In this scenario, the master could appoint a new master or the remaining battery packs could designate a new master before the existing master leaves the network. If there is insufficient time for the master to inform the network of its leaving, the remaining battery packs will learn of its disappearance in the normal course of network communications, and designate a new master as previously described. For example, at a time when the master stops communicating with the slaves, indicating that the master has become disabled, the slaves would communicate to designate a new master to take over control of the network. This new master, due to the prior updating, can start off where the original master stopped, thereby providing a failover mechanism. The advantage of this type of system is that there would be no single point of failure. Alternatively, an active master my designate back-up masters based upon system performance and information that is collected through network operations. The back-up masters will monitor the master and will take over should the master not respond within a predetermined time period. This allows for rapid succession of masters reducing decision making as alternate masters are already in place.

The master can store the table of battery pack identities and their associated health indications in addition to the standard network data held by any station in the network (including for example master or slave status-related data). This data can be cached in a memory of the master, and can be distributed to all the slaves in the network. Therefore, when the master leaves the network, the network will designate a new master, as previously described above. Inasmuch as the new master has the same data as the old master, the network can continue uninterrupted.

In addition, the master can maintain a time-out system such that if no signal is received from a given slave within a predefined time period, then the slave is deleted from the network. Alternatively, or in addition, the master can monitor a power level required by the master to receive signals from a slave. A threshold power level can be determined, for example based on the system or communication protocol parameters, indicating that the slave can no longer communicate in the network when its received power is less than the threshold. When this threshold is reached the master will start a time-out period. If the receive power required remains below the threshold beyond the time-out period, then the slave is considered as having left the network and its data is removed from the cache maintained at the master.

Accordingly, referring back to FIG. 2, master 100b may be able to communicate with several slave battery packs 100a, 100c, 100d, 100e in close proximity in a first room (Room 1), but due to poor signal strength 200 with other battery packs 100f, 100g, 100h, 100i the master 100b will not be able to communicate with these other battery packs in Room 2. In this case, the master will not attempt to communicate with battery packs in Room 2 and only select the healthiest battery within its local peer-to-peer communication network in Room 1. This is advantageous since it would not be desirable to have a user searching from room to room to find the healthiest battery pack of a network group. Instead, the present invention attempts to limit peer-to-peer network groups to only those battery packs that are in close proximity, i.e. within a room.

Therefore, master 100b will communicate only with battery packs 100a, 100c, 100d, 100e of its local group in Room 1 and obtain health information from each. In this example, it may be that battery pack 100c is healthiest, and master sends a signal to battery pack 100c to trigger its light indicator 112c to let a user in Room 1 know that it is the healthiest. For example, the indicator could be lighted constant blue or blink green to show its healthiest status, as long as the light cannot be confused with a charging (constant red) or charged (constant green) indication. In one embodiment, only one of the battery packs will have a lighted indicator showing its healthiest status (or more than one if there is a tie for healthiest status or possibly a certain percentage of the healthiest batteries). However, in another embodiment, all of the battery packs can show their health status in different ways. For example, constant blue can indicate the healthiest battery packs, constant yellow can indicate less healthy battery packs, and constant orange can indicate the least healthy battery packs. Of course, different color/blinking lighted indicator schemes can be used.

In another embodiment, the firmware or data on the battery pack can be wirelessly upgraded without having to issue an upgrade to a host computer to then reprogram the battery. This gives an option to change charge data, get custom notifications from the battery, firmware upgrade for the processor, etc. Alternatively, there can also be real time custom notification commands sent from a host computer, for example all batteries above 90% health can be asked to start blinking green.

Figure 3:
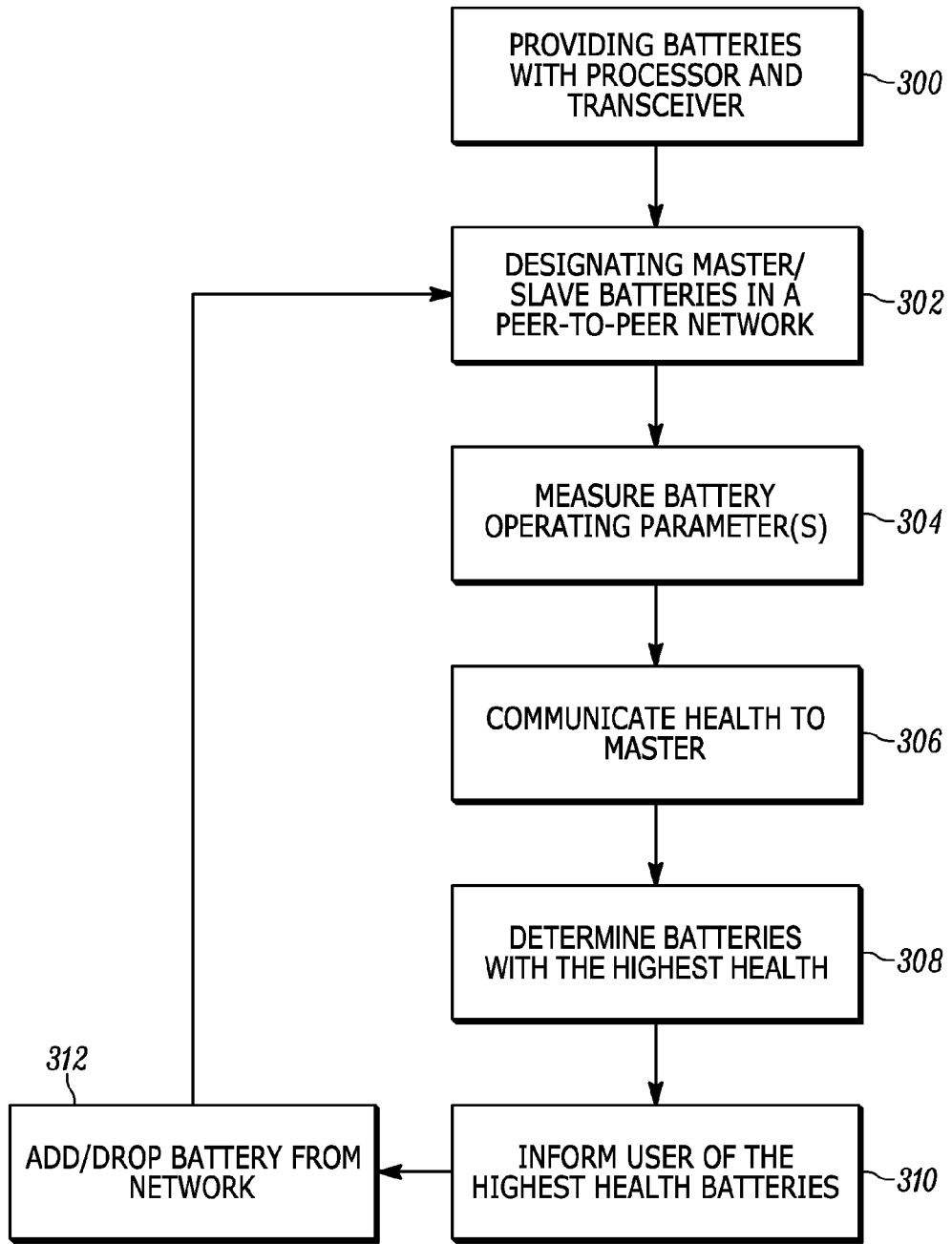
FIG. 3 is a flowchart of a method, in accordance with the present invention.

FIG. 3 illustrates a flowchart of a method for operating a peer-to-peer wireless communication network for batteries, in accordance with the present invention. The method includes providing 300 a plurality of rechargeable batteries, each battery internally housing a processor and a wireless communication transceiver coupled thereto. Preferably, each battery is provided with a user interface (e.g. light indicator) coupled to the battery processor.

The method includes designating 302 one of the batteries as a master in the network, and designating the remaining batteries as slaves.

The method includes measuring 304 at least one battery operating parameter for each battery by its associated processor. The battery operating parameters indicated a health of the battery, and can include a level of charge of the battery, open circuit voltage, etc.

The method further includes peer-to-peer communicating 306 a health indication broadcast from each battery to the master, the health indication based on weightings of the at least one battery operating parameter. The health indication can include a plurality of weighted battery operating parameters.

The method further includes determining 308, by the master using the health indications from each battery, which of the batteries have the highest health (e.g. level of charge) among the plurality of batteries.

The method further includes informing 310 a user of those batteries having the highest health (e.g. level of charge). This can include the master using the peer-to-peer network to send a signal identifying those batteries having the highest health (e.g. level of charge), wherein each of those batteries identified in the signal can alert a user on its associated user interface (e.g. by triggering the light indicator) that it is one of the healthiest batteries (e.g. highest level of charge) among the plurality of batteries. The lighted indicator can indicate a charging status of the battery as well as indicating a health of the battery, and wherein the light indicator turns off when coupled to the communication device.

The method further includes automatically adding or removing 312 a battery to the network on an ad-hoc basis.

Advantageously, for those users that operate with a large group of battery packs the present invention provides a fast and efficient way to choose the best pack out of a group. For mission critical applications such as military or hospitals, where a user sometimes does not have time to decide on the best battery pack, the present invention provides a fast and efficient way of selecting the best battery pack out of a group. In addition, since intelligence is built into the batteries, the present invention provides a way to indicate the healthiest battery pack in a charging station without any additional engineering, which simplifies charger implementation. In other words, the charging station can be made simpler by keeping most of the intelligence and indications on the battery pack itself.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operating a peer-to-peer wireless communication network among batteries, the method comprising:
   providing a plurality of batteries, each battery internally housing a processor and a wireless communication transceiver coupled thereto;
   designating one of the batteries as a master in the network, and designating the remaining batteries as slaves;
   measuring at least one battery operating parameter for each battery by its associated processor;
   peer-to-peer communicating a health indication of each battery, based on the at least one battery operating parameter, to the master,
   determining, by the master using the health indication from each battery, which one or more batteries is the healthiest among the plurality of batteries; and
   informing a user of the healthiest one or more batteries.

2. The method of claim 1, wherein in the providing step the batteries are rechargeable batteries, and wherein the at least one battery operating parameter is a level of charge of the battery.

3. The method of claim 1, wherein in the providing step each battery is provided with a user interface coupled to the battery processor, and wherein in the informing step the master uses the peer-to-peer network to send a signal identifying those batteries having the highest level of charge, wherein each of those batteries identified in the signal can alert a user on its associated user interface that it is one of the healthiest batteries among the plurality of batteries.

4. The method of claim 1, wherein the at least one battery operating parameter is an open circuit voltage of the battery.

5. The method of claim 1, wherein the communicating step broadcasts the health indication based on weighting the at least one measured battery operating parameter, and further comprising determining by the master which one or more of the batteries is healthiest among the plurality of batteries based on the health indication.

6. The method of claim 1, further comprising automatically adding or removing a battery to the network on an ad-hoc basis.

7. The method of claim 1, wherein in the providing step each battery is provided with a light indicator coupled to the processor, and further comprising informing a user of the one or more healthiest batteries by triggering the light indicator.

8. The method of claim 7, wherein the light indicator is operable to indicate a charging status of the battery as well as indicate a health of the battery, and wherein the light indicator turns off when coupled to the communication device.

9. A battery comprising:
   battery cells;
   a wireless transceiver operable on a peer-to-peer wireless communication network having a plurality of batteries; and
   a processor coupled to the battery cells and transceiver, and operable to control the transceiver, wherein the processor is further operable to:
      communicate with the plurality of batteries to designate one of the batteries as a master in the peer-to-peer network and the remaining batteries as slaves,
      measure at least one battery operating parameter for the battery cells, and
      communicate a health indication based on the at least one battery operating parameter to the master,
   wherein
      when the battery is the master, the processor is further operable to determine, using the health indication from each battery, which one or more of the batteries is the healthiest among the plurality of batteries and direct the healthiest one or more batteries to inform a user that they are the healthiest.

10. The battery of claim 1, wherein battery is a rechargeable battery, and wherein the at least one battery operating parameter is a level of charge of the battery cells.

11. The battery of claim 9, further comprising a user interface coupled to the processor, and wherein when the battery is identified as one of the healthiest among the plurality of batteries, the processor is further operable to alert a user on its associated user interface that it is one of the healthiest batteries among the plurality of batteries.

12. The battery of claim 9, wherein the at least one battery operating parameter is an open circuit voltage of the battery.

13. The battery of claim 9, wherein the processor directs the transceiver to broadcast the health indication based on weighting the at least one measured battery operating parameter.

14. The battery of claim 9, further comprising a light indicator coupled to the processor, and wherein when the battery is identified as one of the healthiest batteries, the processor is further configured to inform a user by triggering the light indicator.

15. The battery of claim 14, wherein the light indicator is operable to indicate a charging status of the battery as well as indicate a health of the battery, and wherein the light indicator turns off when coupled to the communication device.

* * * * *